March 9, 1965 MASATOSHI OKAZAKI ET AL 3,172,949

MAGNETIC RECORDING AND REPRODUCTION

Filed Oct. 11, 1960

INVENTORS
MASATOSHI OKAZAKI
BY TATSUO KONISHI

Roy C. Hopgood
ATTORNEY

United States Patent Office 3,172,949

Patented Mar. 9, 1965

3,172,949

MAGNETIC RECORDING AND REPRODUCTION

Masatoshi Okazaki and Tatsuo Konishi, Tokyo, Japan, assignors to Nippon Electric Company, Limited, Tokyo, Japan, a corporation of Japan

Filed Oct. 11, 1960, Ser. No. 62,001
4 Claims. (Cl. 178—6.6)

Figure 1:
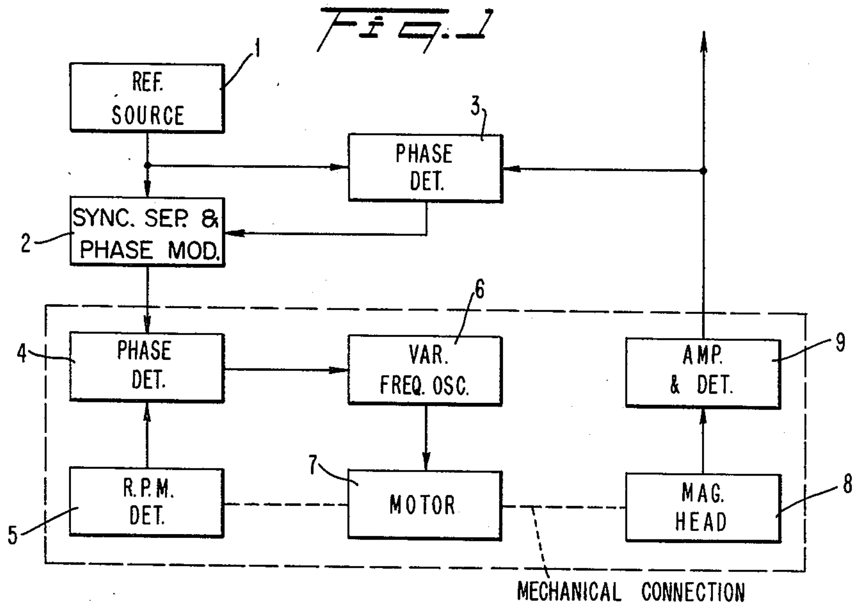

The invention relates to a magnetic recording and reproducing device which records and reproduces magnetically, on or from a tape or other movable record medium, a television signal or other composite signal including a component of a fixed frequency, such as a television synchronizing signal, and an information signal component.

An object of this invention is to remove disturbance of synchronization caused by switching or gating of the signals.

Another object is to enable a special effect to be obtained, such as the so-called montage in a reproduced picture by synchronization of the vertical synchronizing signal, vertical and horizontal synchronizing signals or other synchronizing signals included in the reproduced signals with corresponding signals generated by a signal generator at the studio or transmitting station.

The invention may be applied to means for recording and reproducing a television signal waveform or other composite waveform which includes a component of a fixed frequency, such as a synchronizing signal, and an information component by use of a head assembly which may comprise one or more magnetic transducers associated with a record medium such as a tape or a cylinder or any other magnetic record medium.

The principle of the invention will be explained herein with reference to the well-known type of video tape synchronizing signal and means for feeding the tape synchronously with the rotation of the head assembly.

As well known, in the above-mentioned type of video tape recorder, the rotation frequency of the head assembly is locked to a vertical synchronizing signal in recording the composite signals and, on the other hand, is locked in reproducing the composite signals, to a suitable frequency such as that of a reference vertical synchronizing signal generated in the studio of the station.

In the conventional system, however, as phase of the signal is not locked to any reference signal, difficulties exist in keeping the synchronizing signals of such reference signal and reproduced signal in the same phase.

An object of the invention is to remove such difficulties as mentioned above.

More specifically, the invention provides for a magnetic recording and reproducing device of television signals or other composite signals through the use of a rotating head assembly, means for detecting a phase difference between the reproduced synchronizing signal, or other signal to be employed for synchronization, and a reference synchronizing signal, or other signal also to be employed in the synchronization, means for suitably delaying said reference synchronizing signal or said other reference signal controlled by said phase difference and means for maintaining synchronization in the reproducing period by controlling rotation control servo mechanism for the rotating head assembly.

Figure 2:
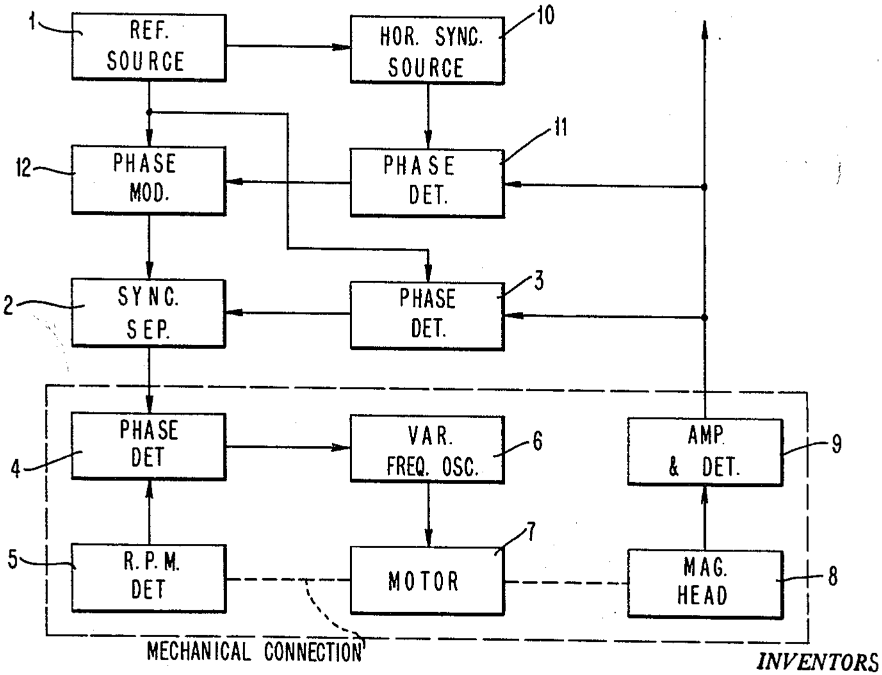

The above-mentioned and other features and objects of this invention and the manner of attaining them will become more apparent and the invention itself will be best understood by reference to the following description of an embodiment of the invention taken in conjunction with the accompanying drawing, wherein:

FIG. 1 shows, in block form, an embodiment of this invention as applied to the aforementioned type of video tape recorder; and FIG. 2 shows, in block form, another embodiment of the invention.

In the drawings, the dotted enclosure surrounds units included in a conventional video tape recorder of the type referred to above.

Referring to FIG. 1, a reference synchronizing signal for the reproduced signal or television signal is applied from source 1, through a circuit means 2 to a phase difference detector 4. The circuit 2 may be composed of means for separating out synchronizing signals and a variable delay line or phase modulator, this circuit being shown for purposes of illustration as a synchronous separator and phase modulator. A drive motor 7 is provided for rotating a magnetic head assembly 8, the latter being mechanically connected to a rotation detector 5. The output signal of detector 5 is applied to the phase difference detector 4, and the output signal of the phase difference detector is employed to control the frequency of a variable frequency oscillator 6 and, therethrough, the speed of the driving motor 7 and, hence, the rate of rotation of the head assembly.

The reproduced signal is derived from rotating head assembly 8 through an amplifier and detector 9.

The reference signal from source 1 and the reproduced signal from amplifier and detector 9 are applied to phase difference detector 3 and, by the output of the detector 3, the variable delay circuit or phase modulator included in the circuit 2 is controlled. Accordingly, the recorder which comprises means for rotating the recording and reproducing head assembly synchronously with a vertical phase difference between the reference signal and the reproduced signal can be made sufficiently small so that the so-called synchronizing hold would be effectively accomplished, the loop gain being made large enough.

The arrangement as shown in FIG. 1 is an example of the invention for accomplishing synchronizing hold with say, a vertical synchronizing signal only. However, synchronizing hold with both vertical and horizontal reference synchronizing signals can be obtained by the same servo principle. The latter case is shown in FIG. 2.

The arrangement of FIG. 2 is obtained by adding to the arrangement of FIG. 1 a required reference horizontal synchronizing signal source 10, a phase difference detector 11 and a circuit 12. The circuit 12 may be a variable delay circuit or phase modulator, as desired, the latter being employed for purposes of illustration. The reference horizontal synchronizing signal from the source 10 may be included in the reference signal from the signal source 1; however, these sources are shown separated from each other, for convenience.

In this case, a reference horizontal synchronizing signal from the source 10 and a horizontal synchronizing signal included in a composite reproduced signal, reproduced by the magnetic head 8 and passed thereby through amplifier 9, are added to second phase difference detector 11, the output signal of which causes the variable delay circuit or phase modulator 12 to be controlled, so that synchronizing holds for both the vertical and horizontal are accomplished by the FIG. 2 embodiment.

In the FIG. 2 embodiment, it is to be noted that the same technical merits are obtainable by interchanging the variable delay circuit or phase modulator 2, 12, for vertical and horizontal synchronizing signal respectively, with each other.

The principle of the invention has been explained with particular reference to the embodiments in FIGS. 1 and 2, but the invention is not thereby limited in scope since it should be understood that other modifications are possible within this invention.

We claim:

1. In a recording and reproducing device including a motor for driving a tape and a magnetic transducer, a system for synchronizing television signals comprising a reference synchronization signal source, a first phase difference detector coupled to receive a signal from said reference signal source, a magnetic head mechanically coupled to the motor for deriving a reproduced signal from the tape, an amplifier to amplify said reproduced signal, means for feeding the reproduced signal from the output of said amplifier to said first phase difference detector where the phase of said reproduced signal is compared to the phase of said signal from said reference source to derive an output signal which is proportional to a phase difference between these two signals, a synchronous signal separator circuit coupled through a signal path to receive the signal from said reference source, said synchronous signal separator circuit further including a variable delay line portion for receiving said output signal from said first phase difference detector, a second phase difference detector coupled to receive the output from said synchronous signal separator circuit, a motor speed detector circuit and means for feeding a signal therefrom to said second phase difference detector wherein an output signal is developed which has a value depending upon the phase difference between the signal from said motor speed detector circuit and the output from said synchronous signal separator circuit, a variable frequency oscillator for receiving the output signal from said second phase difference detector to vary the frequency thereof in accordance with variations in the output signal of said second phase difference detector, and means for coupling the output of said oscillator to said motor to vary the speed thereof, whereby the rotational frequency of said magnetic head may be varied.

2. In a recording and reproducing device including a motor for driving a tape and a transducer, a system for synchronizing television signals comprising a reference synchronization signal source, a first phase difference detector coupled to receive a signal from said reference signal source, a reproducing head assembly mechanically coupled to the motor for deriving a reproduced signal from the tape, an amplifier to amplify said reproduced signal, means for feeding the reproduced signal from the output of said amplifier to said first phase difference detector where the phase of said reproduced signal is compared to the phase of said signal from said reference source to derive an output signal which is proportional to a phase difference between these two signals, a synchronous signal separator circuit coupled to also receive the signal from said reference source, said synchronous signal separator circuit further including a phase modulator for receiving said output signal from said first phase difference detector, a second phase difference detector coupled to receive the output from said synchronous signal separator circuit, a motor speed detector circuit and means for feeding a signal therefrom to said second phase difference detector wherein an output signal is developed which has a value depending upon the phase difference between the signal from said motor speed detector circuit and the output from said synchronous signal separator circuit, a variable frequency oscillator for receiving the output signal from said second phase difference detector to vary the frequency thereof in accordance with variations in the output signal of said second phase difference detector, and means for coupling the output of said oscillator to said motor to vary the speed thereof, whereby the rotational frequency of said head assembly may be varied.

3. The invention described in claim 1 which further includes a variable delay circuit connected to said signal path between said reference signal source and said synchronous signal separator, a third phase difference detector, a second reference synchronization signal source having its input coupled to receive a signal from the first received reference signal source and having its output coupled to said third phase difference detector, means coupling said reproduced signal from the output of said amplifier to said third phase difference detector wherein the phase of said reproduced signal is compared with the phase of said output from said second reference signal source to derive an output signal proportional to a phase difference between these two signals, and means for coupling the output of said third phase difference detector to said variable delay circuit wherein this output is compared with the signal from the first mentioned reference signal source, whereby holding of both vertical and horizontal signals may be achieved.

4. The invention described in claim 3 wherein said variable delay circuit is replaced by a phase modulator.

References Cited by the Examiner

UNITED STATES PATENTS

| | | | |
|---|---|---|---|
| 2,774,927 | 12/56 | Evans | 178—6.6 |
| 2,854,526 | 9/58 | Morgan | 178—6.6 |
| 2,944,108 | 7/60 | Houghton | 178—6.6 |
| 2,979,557 | 4/61 | Schroeder | 178—6.6 |
| 3,003,025 | 10/61 | Ginsburg | 178—6.6 |

DAVID G. REDINBAUGH, *Primary Examiner.*

NEWTON N. LOVEWELL, *Examiner.*